United States Patent Office 3,402,149
Patented Sept. 17, 1968

3,402,149
PROCESS FOR PREPARING POLYUREA-POLYURETHANE MOLDING POWDERS
Fred L. Walters, Levittown, Pa., assignor to Thiokol Chemical Corporation, Bristol, Pa., a corporation of Delaware
No Drawing. Filed Dec. 4, 1964, Ser. No. 416,156
3 Claims. (Cl. 260—75)

ABSTRACT OF THE DISCLOSURE

An aqueous emulsion polymerization procedure is provided for the preparation of polyurea-polyurethane molding powders. The powders themselves are novel compositions of matter.

This invention relates generally to the formation of polyurea-polyurethane molding powders, and more specifically relates to an aqueous high-temperature process to reproducibly prepare polyurea-polyurethane molding powders.

Both polyurea and polyurethane moldable compositions are known. Polyureas mold to form relatively brittle cast articles due to the rigidity imposed by urea linkages. Polyurethane moldable compositions must either be cross-linked with a curing agent during the molding process to form thermoset castings, or must be of unusually high molecular weight, say about 30,000 to 50,000, as in the so called "virtually cross-linked" elastomers which remain after casting both organic solvent soluble and thermoplastic. The latter are described by C. S. Schollenberger et al. in their article, "Polyurethane VC, a Virtually Cross-Linked Elastomer," Rubber World, 137, 549 (1958). Bayer in his article, "Polyurethanes," Modern Plastics, page 150 (June 1947), describes an organic solvent method of producing a moldable polyurethane powder. It is desirable, however, to provide a moldable polyurea-polyurethane powder to offset the disadvantages of brittleness in castings are exhibited with the polyureas, and to offset the need for a curing agent during the molding process as with the curable polyurethanes which form thermoset castings, and also to offset the high degrees of thermoplasticity and organic solvent solubility as exhibited by castings of the virtually crosslinked polyurethane elastomers.

The preparation of moldable polyurea-polyurethanes is known. Bayer et al. in their article "New Types of Highly Elastic Substances, Vulcollans," Rubber Chem. and Technol. 23, 817–818 and 824 (1950), report the formation of polyurea-polyurethanes by chain extension of isocyanate-terminated polyester polyurethanes, commonly known to the art as "prepolymers," or as the authors would term them "isocyanate polyesters," with water. Müller et al. in their article "Polyurethanes, IX, New Types of Highly Elastic Products: Vulcollans, Part 2," Rubber Chem. and Technol. 26, 494 and 502 (1953), also reveal formation of moldable polyurea-polyurethanes by a similar chain extension of urethane prepolymers with water. Rugg in his U.S. Patent 2,702,797 similarly reveals a mass polymerization method for preparation of polyurea-polyurethanes, which latter he calls "polyalkylene ether glycol-arylene diioscyanate-water polymers." Rugg's technique differs from the method used by Bayer et al. and Müller et al. in that prepolymers are not necessarily used, but all possible reactants, i.e. the polyether glycol, polyisocyanate and water, are reacted at one time. These are commonly called "one-shot" reactions. Nelson in his U.S. Patent 2,734,045 also addresses himself both to water-chain-extended-prepolymers and to "one shot" polyurea-polyurethanes by a mass polymerization technique. Carter in his U.S. Patent 2,830,037 reveals formation in organic solvents of prepolymers chain extended with urea linkages via water at room temperatures to provide small beads of polyurea-polyurethanes which are subsequently cured. Walter in his U.S. Patent 2,871,227 also prepares polyurea-polyurethanes by preparing polyurea-polyurethane prepolymers in a prepolymer or a one-shot mass polymerization and then subsequently curing the rubbery mass thus provided.

The foregoing publications however do not show an aqueous emulsion polymerization method to reproducibly produce polyurea-polyurethane molding powders. The emulsion method is particularly advantageous, especially where water is used as one of the major liquid components of the dispersant phase, for its inherent economies of both processing ease and control of the rate of polymerization. Berger et al. in their Du Pont Company publication, Contribution No. 165 of the Elastomers Laboratory, published between April 1959 and January 1960, entitled "Paper Reinforcement With Liquid Urethane Emulsions," reveal formation of aqueous-organic solvent emulsions of polyurea-polyurethanes formed in situ at room temperature for use on paper substrates. They do not reveal whether the solids which may form and precipitate out can be molded, and in fact desired to maintain an emulsion and avoid the separation of solids therefrom. Further economic advantage may, however, be attained by eilminating the use of organic solvents and yet to reproducibly prepare polyurea-polyurethane molding powders using an emulsion polymerization method.

Therefore, an important object of the present invention is to provide an aqueous and solventless emulsion polymerization method to reproducibly prepare polyurea-polyurethane molding powders.

Another object of the present invention is to provide an aqueous and solventless emulsion polymerization method to prepare polyurea-polyurethane molding powders which soften or melt within a relatively narrow range of temperatures.

Other desirable objects of this invention are apparent from or inherent in the following descriptions and examples.

The reproducible preparation of polyurea-polyurethane molding powders by aqueous-solventless emulsion polymerization is fraught with difficulties, outstanding among which is the avoidance of mass coagulation of the polymer particles during their formation and during subsequent separation of the particles from the aqueous mother liquor.

Unexpectedly, I have discovered that the foregoing difficulties may be largely dispelled and the objects of this invention may be attained if one (a) Disperses a polyurethane prepolymer having an isocyanate content of from about 1% to 15% by weight in at least an equal weight of water so as to form an emulsion,
(b) Maintains the emulsion at 130° F. to 160° F. for from 15 to 120 minutes,
(c) Separates the solid particles of polyurea-polyurethane polymer formed during step (b) from its aqueous mother liquor prior to cooling, and
(d) Drys the separated polymer particles to thus form a polyurea-polyurethane powder suitable for heat and pressure molding without a curing agent.

Additionally, I have discovered that by using a (urethane prepolymer)-(monohydric alcohol or monobasic carboxylic acid) adduct in the foregoing process in place of the urethane prepolymer that polyurea-polyurethane molding powders may be formed which have a desirably and substantially reduced softening point over polyurea-polyurethane molding powders formed from the same prepolymer without adduct formation.

The polyurethane prepolymers which may be employed to practice the invention are characterized by having a plurality of reactive isocyanate groups separated by a polyester and/or polyether and/or polyesterurethane and/or polyetherurethane molecular backbone. The prepolymers are formed by the reaction of one or more polyester and/or polyether polyols with one or more polyisocyanates, that is isocyanate compounds having two or more reactive isocyanate groups per molecule, such that essentially linear isocyanate terminated molecules are provided of the type, e.g., where a diisocyanate is used,

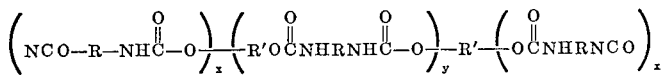

wherein R is an arylene or alkylene group, R' is a polyester and/or polyether group, $x$ is a number from 1 to 3 and $y$ is a number from 0 to 6. The preferred prepolymers for present use have a molecular weight from about 500 to about 6,000, and are prepared using diisocyanates. They have a reactive isocyanate content of from about 1% to about 15% by weight of the prepolymer. Methods for preparing suitable prepolymers are described in detail in the publications referred to above and are included herein by reference.

In especially preferred embodiments of this invention prepolymer adducts are employed in place of the prepolymers above described. The prepolymer adducts are prepolymers as defined above, which have been modified by reaction with minor amounts of high boiling, e.g. boiling point in excess of 180° F., saturated monohydric alcohols or monobasic carboxylic acids. Exemplary alcohols include the propyl, butyl and octyl alcohols, and the saturated fatty-acid alcohols. Exemplary acids include aromatic acids which have no olefinic unsaturation, such as benzoic acid. Although it is not fully understood why such modification will provide in the end polyurea-polyurethane molding powders which have desirably and substantially reduced softening points, it is believed that the adducts formed contain a proportion of prepolymer molecules which have some of their isocyanate terminals reacted with the monofunctional alcohol and/or acid, and thus are prevented from further chain extension during the water treatment step of the present process. I have found, moreover, that only certain proportions of the monofunctional alcohols and/or acids may be used to modify the prepolymers and still permit subsequent formation without coagulation of particulate molding powders in the present process. These proportions may be defined in ratios of equivalent weights of prepolymer in terms of reactive isocyanate to mols or equivalent weights of monohydric alcohol and/or monobasic acid. These ratios, hereinafter termed NCO/H*, may not be substantially less than 3. In other words not more than substantially one out of every three reactive isocyanate groups present in the prepolymer may be reacted with the monofunctional alcohol or acid and still provide an uncoagulated molding powder by the present process. For the purposes of this invention when free polyisocyanate, not a part of the prepolymer, is also present with the prepolymer, such as occurs when an excess of polyisocyanate is used in prepolymer preparation, the reactive isocyanate of the polyisocyanate is to be considered for purposes of calculation as though it were contributed by the prepolymer.

The following examples detail preferred embodiments of the present invention, but are not to be construed as limitations thereon for many other variations may advantageously be made in the concentration of emulsion components, types of prepolymers and prepolymer-adducts, temperatures of reaction, modes of effecting emulsions, modes of separating polymer particles from their mother liquor and the drying of the molding powders which fall within the scope of the invention as broadly described above and claimed herein.

THE EXAMPLES

An exemplary prepolymer was prepared by reacting castor oil and an excess of 2/4- and 2/6- (80/20% by weight) toluene diisocyanate isomers at elevated temperatures and in the absence of water such that a liquid prepolymer product having an isocyanate content of 10.2 to 10.8% by weight, and an equivalent weight of about 420 was obtained. The exemplary prepolymer was used in pursuing the process in Examples 1 and 2; it was modified with different quantities of normal octanol to provide the adducts used in Examples 3 to 6; and it was also modified with different quantities of benzoic acid to provide other adducts used in Examples 7 to 11.

Octanol adducts

*Adduct 1.*—A one-liter reaction vessel was charged with 600 parts by weight of the exemplary prepolymer (1.43 equivalent weights), 0.6 part by weight of n-octanol (0.0046 equivalent weights) to provide a ratio NCO/H* of about 311, and 18 parts by weight of the reaction accelerator catalyst dibutyl tin dioctoate. The charged materials were agitated and elevated to 250° F. for about one half hour to provide upon cooling a liquid prepolymer adduct, wherein approximately one of each 300 isocyanate groups as present in the prepolymer was reacted with the octanol.

*Adduct 2.*—In similar manner to that used to prepare Adduct 1, 200 parts by weight (0.476 equivalent weights) of the exemplary prepolymer, 6 parts by weight (0.046 equivalent weights) of n-octanol to provide a ratio NCO/H* of about 103, and 0.2 part by weight of the catalyst dibutyl tin dioctoate were used to prepare a liquid prepolymer adduct, wherein approximately one of each 100 isocyanate groups as present in the prepolymer was reacted with the octanol.

*Adduct 3.*—A one-liter reaction vessel was charged with 400 parts by weight of the exemplary prepolymer (0.952 equivalent weights), 12.1 parts by weight of n-octanol (0.093 equivalent weights), to provide a ratio NCO/H* of about 102, similar to that for Adduct 2. No accelerator catalyst was used. The reaction mixture was elevated to 212° F. with agitation and maintained there for one-half hour to provide upon cooling liquid prepolymer Adduct 3.

*Adduct 4.*—In similar manner to that used to prepare Adduct 3, Adduct 4 was prepared with 400 parts by weight of the exemplary prepolymer (0.952 equivalent weights) and 44 parts by weight of n-octanol (0.337 equivalent weights) to provide a ratio NCO/H* of 2.82.

Benzoic acid adducts

*Adduct A.*—In similar manner to that used to prepare Adduct 3, liquid prepolymer Adduct A was prepared with 200 parts by weight of the exemplary prepolymer (0.476 equivalent weights) and 2.1 parts by weight of benzoic acid (0.0172 equivalent weights) to provide a ratio NCO/H* of about 27.6.

*Adduct B.*—Using 400 parts by weight of the exemplary prepolymer (0.952 equivalent weights) and 9 parts by weight of benzoic acid (0.0736 equivalent weights) in manner similar to that used to prepare Adduct 3, liquid prepolymer Adduct B was prepared to provide a ratio NCO/H* of about 12.9.

*Adduct C.*—In like manner to that used to prepare

Adduct 3, liquid prepolymer Adduct C was prepared using 400 parts by weight of the exemplary prepolymer (0.952 equivalent weights) and 12.2 parts by weight of benzoic acid (0.1 equivalent weights) to provide a ratio NCO/H* of 9.52.

*Adduct D.*—Liquid prepolymer Adduct D was prepared according to the procedure for Adduct 3 using 400 parts by weight (0.952 equivalent weights) of the exemplary prepolymer and 36.6 parts by weight (0.3 equivalent weights) of benzoic acid to provide a ratio of 3.17.

*Adduct E.*—Liquid prepolymer Adduct E was prepared in similar manner to Adduct D using 400 parts by weight of the exemplary prepolymer (0.952 equivalent weights) and 61 parts by weight of benzoic acid (0.5 equivalent weights) to provide a ratio NCO/H* of 1.9.

EXAMPLE 1

One hundred parts by weight of the exemplary prepolymer, prepared as above, was charged to a vessel. Six parts by weight of the hydrophilic dispersing agent polyoxyethylene sorbitan monolaurate, having a hydrophile-lipophile balance value of 16.7, and marketed by Atlas Powder Co. as Tween 20, was added to the prepolymer and dispersed therein. Two hundred parts by weight of water was charged to another vessel, and 3 parts by weight of the lipophilic dispersing agent sorbitan monolaurate, having a hydrophile-lipophile balance value of 8.6, and marketed by Atlas Powder Co. as Span 20, was added thereto and dispersed therein. The water mixture was then added to the prepolymer mixture with mixing. The emulsion formed was heated to 150° F. and maintained thereat with mixing for 15 minutes. The solid-liquid dispersion formed did not coagulate, and the solid polyurethane-polyurea particles suspended therein remained as discrete entities. They were separated from the mother liquor prior to cooling by filtration under aspiration pressures. Filtration was fast and facile. The molding powder so obtained was then dried and had a pink coloration.

EXAMPLE 2

Some 200 parts by weight of water was charged to a vessel and maintained at 140° F. Approximately 6 parts of Tween 20 was dispersed therein with slow mixing. The exemplary prepolymer, 100 parts by weight, was then charged thereto over a 10–15 minute interval with rapid mixing. The temperature of the emulsion thus formed was maintained at about 140 to 146° F. for about one hour with rapid mixing. Polyurethane-polyurea particles formed and in suspension were then separated from the mother liquor by filtration under vacuum before cooling. A fine white particulate polyurethane-polyurea molding powder was recovered and dried at 180° F. under vacuum for about three days.

The dry molding powder obtained had a softening point at about 328° C. at atmospheric pressure, as determined on a Fisher-Johns melting point stage at a 10° C. rise/minute. The powder was pressed out at 320° F. under 25,000 lbs./in.$^2$ for 60 minutes to provide translucent plastic test sheets which had a hardness of 98 Shore "A" durometer degrees, an elongation of about 20%, an ultimate tensile strength of about 1,000 p.s.i., and a tear strength of about 80 p.l.i.

EXAMPLE 3

In similar manner to the procedure used in Example 2, a fine white polyurethane-polyurea molding powder was formed from 100 parts by weight of Adduct 1, prepared as above, by emulsifying with 200 parts by weight of water and 6 parts by weight of Tween 20 at 140° F. for about 20 minutes; by separation of the polymer particles formed from the mother liquor by filtration before cooling; and by drying the separated powder at 212° F. under vacuum. Testing sheets were prepared by pressing the powder at 320° F. and 25,000 lbs./in.$^2$ for 30 minutes to provide

| | |
|---|---|
| Hardness, Shore "A," durometer degrees | 98 |
| Percent elongation | 85 |
| Ultimate tensile strength, p.s.i. | 2,200 |
| Tear strength, p.l.i. | 270 |

EXAMPLE 4

An emulsion was formed by charging 200 parts by weight of water to a vessel, dispersing 6 parts by weight of Tween 20 therein, and 100 parts by weight of Adduct 2. The emulsion was raised to 140° F. with mixing over a 15 minute period, and then filtered before cooling. The separated solids were particulate and white, and upon drying at 80° C. under vacuum were pressed into test sheets at 320° F. and 25,000 lbs./in.$^2$ for 30 minutes. The properties obtained were

| | |
|---|---|
| Hardness, Shore "A," durometer degrees | 95 |
| Percent elongation | 170 |
| Ultimate tensile strength, p.s.i. | 2,550 |
| Tear strength, p.l.i. | 220 |

EXAMPLE 5

In similar manner to Example 2 an emulsion was formed with Adduct 3, water and Tween 20 at 140° F. The emulsion was maintained thereat with mixing for one hour. The polymer particles formed were separated from their mother liquor by a facile filtration while hot. The separated polyurethane-polyurea particles, a fine white powder, was then dried under vacuum at 80° C. for about 3 hours. The powder had a softening temperature of 305° C. at atmospheric pressure, and when pressed into test sheets at 320° F. and 25,000 lbs./in.$^2$ for 30 minutes showed a

| | |
|---|---|
| Hardness, Shore "A," durometer degrees | 93 |
| Percent elongation | 115 |
| Ultimate tensile strength, p.s.i. | 1,900 |
| Tear strength, p.l.i. | 270 |

EXAMPLE 6

When Adduct 4 was used in place of Adduct 3 in the procedure of Example 5, the solid polymer formed during the emulsification step agglomerated and coagulated. No powder was formed.

EXAMPLE 7

A fine white polyurea-polyurethane molding powder was prepared by the procedure used in Example 2, substituting Adduct A for the exemplary prepolymer. The powder formed had a softening temperature of 305° C. at atmospheric pressure and upon press out of test sheets had a

| | |
|---|---|
| Hardness, Shore "A," durometer degrees | 94 |
| Percent elongation | 105 |
| Ultimate tensile strength, p.s.i. | 3,000 |
| Tear strength, p.l.i. | 280 |

EXAMPLE 8

Using Adduct B in place of the exemplary prepolymer in the procedure of Example 2, a finely particulate white polyurea-polyurethane molding powder was formed which had a softening temperature of 305° C. at atmospheric pressure, and upon press out of test sheets had a

| | |
|---|---|
| Hardness, Shore "A," durometer degrees | 95 |
| Percent elongation | 100 |
| Ultimate tensile strength, p.s.i. | 2,900 |
| Tear strength, p.l.i. | 335 |

EXAMPLE 9

A finely particulate pink-tinted polyurea-polyurethane molding powder was prepared using Adduct C in place of the exemplary prepolymer in the procedure of Example 2, which had a softening temperature of 285° C. at atmospheric pressure, and upon press out of test sheets had a Hardness, Shore "A," durometer degrees _____ 90
Percent elongation _____ 125
Ultimate tensile strength, p.s.i. _____ 2,175
Tear strength, p.l.i. _____ 210

EXAMPLE 10

A finely particulate white polyurea-polyurethane molding powder was formed using Adduct D in place of the exemplary prepolymer in the procedure of Example 2, which had a softening temperature of 310° C. at atmospheric pressure, and upon press out of test sheets had a Hardness, Shore "A," durometer degrees _____ 94
Percent elongation _____ 125
Ultimate tensile strength, p.s.i. _____ 3,000
Tear strength, p.l.i. _____ 305

EXAMPLE 11

When Adduct E was used in place of Adduct D in the procedure of Example 10, the solid polymer which formed during the emulsification step agglomerated and coagulated. No powder was formed.

The foregoing exemplary prepolymer had an average molecular weight of about 1,260 and an average isocyanate functionality of about 2.7.

It has been discovered that when the isocyanate content of the prepolymer or prepolymer adduct to be used in the present process is substantially less than about 1% by weight, the number of urea linkages produced per unit weight of product is so small as to substantially vitiate the desirable effects sought by the present process. Further, when the isocyanate content of the prepolymer or prepolymer adduct to be used in the present process is substantially greater than about 15% such a profusion of urea linkage is provided in the emulsification step as to make the product obtained approach in properties the pure polyureas with their inherent and undesirable brittleness and high degrees of infusibility.

Other experimental work has shown that agglomeration of solid polymer being formed usually occurs during emulsification at temperatures less than about 130° F., say even at 120° F., and also usually occurs when separation of the solid particles of polyurea-polyurethane polymers from their aqueous mother liquor is attempted after permitting the emulsion to cool substantially below reaction temperatures. It was found that usually about 15 to 120 minutes are adequate reaction times to maintain the emulsion at reaction temperatures prior to separation of the powders from their mother liquor. The purpose in drying the powders after separation is to remove water which would volatilize and cause vapor voids in molded articles made from the powders. An at least equal weight of water has been found adequate for the emulsion; the preferred amount is twice the weight of the prepolymer. The higher reaction temperatures, greater than 160° F., are to be shunted in the present process for sundry other reasons, prominent among which is the tendency for such higher temperatures to promote the crosslinking allophonate and biuret reactions to occur at the expense of the desired linear chain propagation of the polymers by urea linkages. Such biuret and allophonate crosslinked polymers are considered far more difficult to mold, and to make reproducibly.

Many methods for producing emulsions are known, and variations in the type and quantities of emulsifying agents, the necessary degrees of agitative mixing, the order of addition of components, etc. to provide an optimum dispersion of the present prepolymers or adducts in the aqueous phase are all considered to be well within the skill of the ordinary practitioner. So too are the various methods, such as filtration, etc., for separating the present particulate solid polyurea-polyurethanes from their mother liquors, and also specific methods to dry the powders so obtained.

The present invention thus concerns a reproducible aqueous-solventless emulsion process to provide particulate polyurea-polyurethane molding powders. It also concerns such powders made from certain prepolymer-adducts; the powders so produced have substantially reduced softening temperatures over powders produced from the parent prepolymer, and thus are easier to mold. The prepolymer-adduct molding powders provided by the present process also once molded provide good tensile strength properties and outstanding tear strength properties.

The structure of a typical prepolymer was given above for the reaction between a polyfunctional polyol with a diisocyanate, the latter present in quantities in excess of stoichiometric requirements to insure the presence of reactive isocyanate terminals. A more general prepolymer structure may be written to accommodate situations where a polyisocyanate, not necessarily a diisocyanate, is employed to produce a prepolymer for use in the present process, viz.

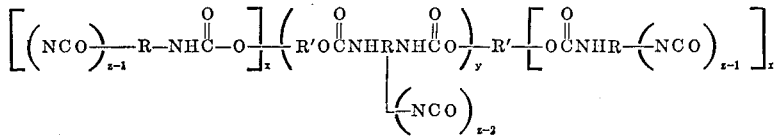

wherein R, R', x and y are as heretofore defined, and z is a number at least 2, and preferably not more than 4. When a polyisocyanate that is not a diisocyanate is used, i.e., where z is greater than 2, it is desirable to use a polyol to prepare the prepolymer which would provide a prepolymer molecular weight towards the upper end of the range of usable molecular weights, i.e., closer to 6,000. This will help prevent too large a number of urea linkages per unit of product weight being produced during the emulsification step, with its concomitant tendency towards greater infusibility in molding and a greater brittleness of the article formed.

The reactions of isocyanate in general are with active hydrogen bearing substances such as are defined by the Zerewitinoff method, Ber. 40, 2033 (1907), Ber. 41, 2236 (1908), and Kohler, J. Amer. Chem. Soc. 49, 3181 (1927). The present adducts are formed with monofunctional alcohols and acids which latter thus form an especially desirable subgroup of active hydrogen bearing substances.

Having thus revealed the invention, I claim:
1. An aqueous and solventless emulsion process for preparing polyurea-polyurethane powders suitable for compression and heat molding which comprises:
 (a) dispersing in the presence of a dispersing agent
  (1) an adduct of a prepolymer, formed substantially by the reaction of a polyisocyanate and a polyol, so as to have a plurality of reactive isocyanate groups separated by intervening structures selected from the group consisting of polyester, polyether, polyesterurethane and polyetherurethane intervening structures, an isocyanate content of from about 1% to 15% by weigh, and a molecular weight of from about 500 to 6000, and
  (2) a monofunctional active hydrogen bearing compound having a boiling point in excess of 180° F. and selected from those monofunctional active hydrogen bearing compounds consisting of saturated monohydric alcohols and nonolefinic monobasic carboxylic acids, such that the ratio of equivalents of prepolymer in terms of isocyanate functionality and of equivalents of monofunctional active hydrogen bearing compounds is at least 3, in an at least equal weight of water so as to form an emulsion;

(b) maintaining said emulsion and at a temperature within the range of about 130° F. to 160° F. for about 15 to 120 minutes;

(c) separating the solid particles of polyurea-polyurethane polymer that are formed during step (b) from their aqueous mother liquor prior to cooling; and (d) drying the separated polymer particles so as to form a powder suitable for compression and heat molding.

2. A process according to claim 1 wherein said monofunctional active hydrogen bearing compound is n-octanol.

3. A process according to claim 1 wherein said monofunctional active hydrogen bearing compound is benzoic acid.

References Cited

UNITED STATES PATENTS

| | | | |
|---|---|---|---|
| 2,801,990 | 8/1957 | Seeger et al. | 260—75 |
| 2,968,575 | 1/1961 | Mallonee | 260—77.5 |
| 2,981,700 | 4/1961 | Parker et al. | 260—29.2 |
| 3,076,770 | 2/1963 | Saunders et al. | 260—775 |
| 3,189,578 | 6/1965 | Kuemmerer | 260—77.5 |
| 3,213,049 | 10/1965 | Heiss | 260—775 |
| 3,248,259 | 4/1966 | Borsellino et al. | 260—29.2 |
| 3,297,649 | 1/1967 | Kirschner | 260—775 |
| 2,830,037 | 4/1958 | Carter | 260—77.5 |

DONALD E. CZAJA, *Primary Examiner.*

M. I. MARQUIS, *Assistant Examiner.*